United States Patent [19]

Beier et al.

[11] Patent Number: 4,719,469

[45] Date of Patent: Jan. 12, 1988

[54] DIRECTION-DETERMINING SYSTEM

[75] Inventors: Wolfgang Beier, Weil der Stadt; Helmut Graf, Stuttgart, both of Fed. Rep. of Germany

[73] Assignee: Standard Elektrik Lorenz AG, Stuttgart, Fed. Rep. of Germany

[21] Appl. No.: 929,935

[22] Filed: Nov. 12, 1986

[30] Foreign Application Priority Data

Nov. 13, 1985 [DE] Fed. Rep. of Germany ....... 3540212

[51] Int. Cl.$^4$ .............................................. G01S 1/38
[52] U.S. Cl. ..................................... 342/434; 342/357
[58] Field of Search ............... 342/357, 428, 433, 442, 342/147, 156, 157, 434

[56] References Cited

U.S. PATENT DOCUMENTS

| | | | |
|---|---|---|---|
| 4,034,376 | 7/1977 | Barton | 342/157 X |
| 4,246,581 | 1/1981 | Di Toro | 342/433 X |
| 4,368,470 | 1/1983 | Mori et al. | 342/428 |
| 4,384,293 | 5/1983 | Deem et al. | 342/352 |
| 4,488,155 | 12/1984 | Wu | 342/157 X |
| 4,638,320 | 1/1987 | Eggert et al. | 342/442 |
| 4,644,358 | 2/1987 | Sekine | 342/357 |
| 4,647,935 | 3/1987 | Helbling | 342/433 |

FOREIGN PATENT DOCUMENTS 55-117977  7/1980  Japan .
0227474  7/1984  Japan .................. 342/433

Primary Examiner—Theodore M. Blum
Assistant Examiner—Bernarr Earl Gregory
Attorney, Agent, or Firm—Christie, Parker & Hale

[57] ABSTRACT

A direction determining system having a Global Positioning System (GPS) receiver, a linear antenna array and a fast switching facility, the linear antenna array comprised of at least two antenna elements and the GPS receiver including two Costas Loops. The fast switching facility permits an input signal received by the two antenna elements to be processed and alternately supplied to the Costas Loops in synchronism for measuring the phases of the input signals received nearly simultaneously. The phase difference between the output signals of the two Costas Loops is measured in a phase meter and the pointing angle of the linear antenna array relative to the direction of a GPS satellite is determined by interferometry.

7 Claims, 1 Drawing Figure

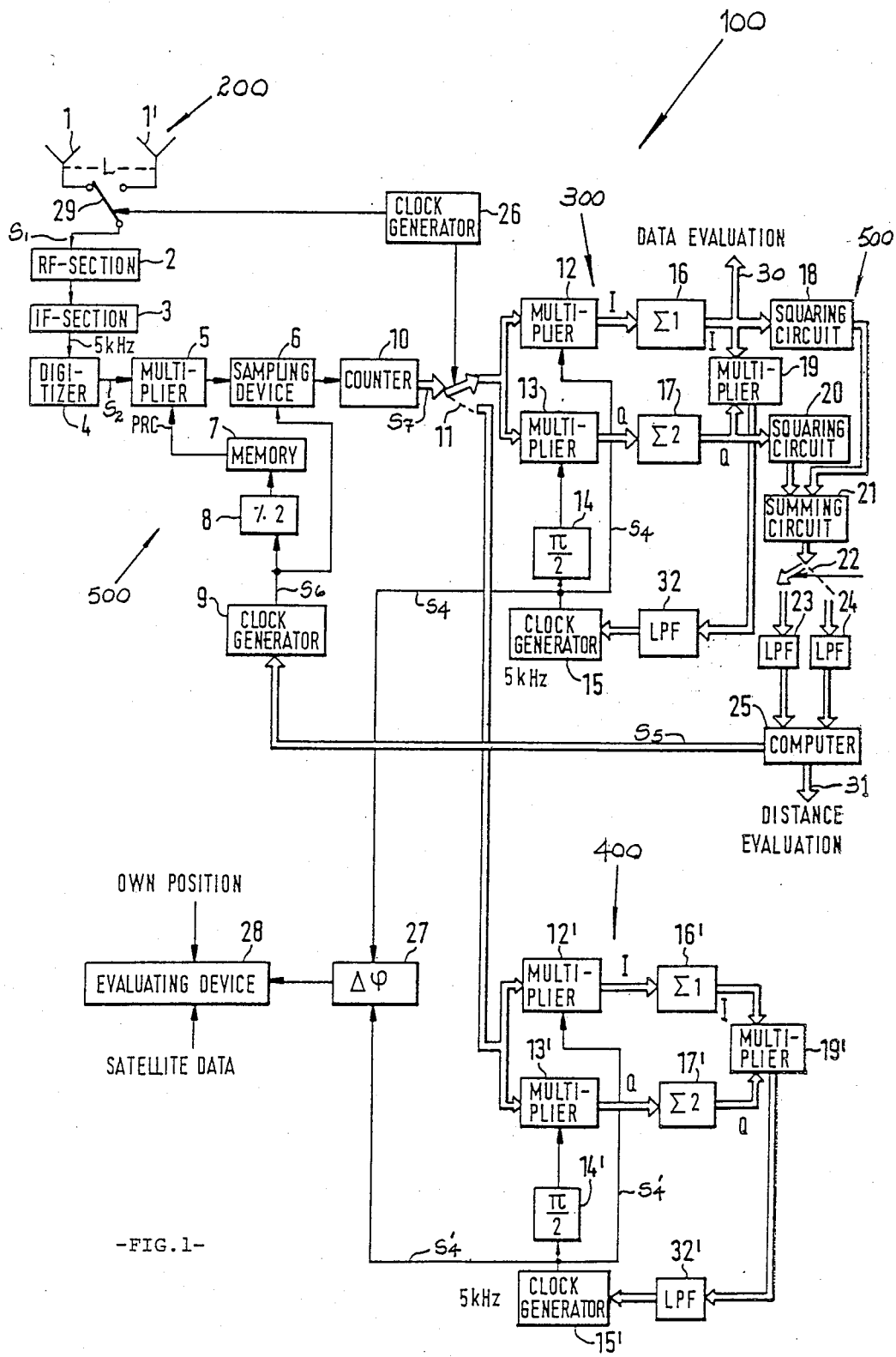
-FIG.1-

DIRECTION-DETERMINING SYSTEM

BACKGROUND OF THE INVENTION

1. Field of the Invention

The invention relates generally to satellite direction determining systems and more particularly to a direction determining system for a Global Positioning System (GPS) having a linear antenna array, a GPS receiver and a switching facility for determining the pointing angle of the linear antenna array.

2. Description of the Prior Art

In the field of satellite navigation, the pointing angle of a linear antenna array relative to the position of a satellite of a Global Positioning System (GPS) has been determined as is described in U.S. Pat. No. 4,384,293. In the Global Positioning System (GPS), the satellite position is known and the location of the direction determining facility is determined with a GPS receiver as described in published German patent DE-A-34 27 058 which corresponds to commonly assigned copending application Ser. No. 758,191 filed on July 23, 1985. From this data, various types of information can be determined such as elevation, azimuth, spatial orientation of the vehicle or aircraft containing the direction determining facility. The number of linear antenna arrays provided is dependent on whether the direction is to be determined in one or more planes.

In the prior art direction determining facility, the linear antenna array consists of a plurality of antennas in which output signals are switched from one antenna to the next such that the locking of the phase-locked loop of the GPS receiver to the received carrier signal is preserved. The above cited U.S. Pat. No. 4,384,293 also mentioned that only two antennas can be employed and in such a case, GPS carrier signals of different frequency are evaluated. The major problem still existing in the prior art is the speed at which the output signals can be switched from one antenna element to the next. It is important that the phases of the carrier signal received at the two antennas can be measured nearly simultaneously. It is the differences in the phases of the carrier signals that are employed in determining the direction of the vehicle or aircraft. Measuring the phases of the carrier signal received at the two antennas nearly simultaneously eliminates errors caused by a movement of the direction-determining facility between the two measurements. The same principle applies to any frequency and phase drift of components which are important for measurement accuracy.

SUMMARY OF THE PRESENT INVENTION

It is therefore an object of the present invention to provide an improved direction determining system capable of fast switching from a first antenna to a second antenna.

Briefly, a preferred embodiment of the present invention includes a direction-determining system having a Global Positioning System (GPS) receiver and at least one linear antenna array comprised of two antenna elements. The GPS receiver includes a plurality of two Costas Loops and the direction-determining system further includes a fast switching facility. The two antenna elements each receive an input signal which is alternately supplied to a processing circuit from each antenna element via a first fast switching facility controlled by a clock generator. A second fast switch in synchronism with the first fast switch alternately supplies the processed signal to one of two Costas Loops which lock with the phase of the received input signal. The switching facility connects the first antenna element to the first Coastas Loop and alternately connects the second antenna element to the second Costas Loop. Because both phase-locked loops remain in lock, fast switching is effected between the antennas. The phases of the input signal received at the two antennas can be measured nearly simultaneously. The phase difference between the output signals of the two Costas Loops is measured in a phase meter and the pointing angle of the linear antenna array relative to the direction of a GPS satellite is determined by employing interferometry. The direction of the pointing angle of the linear antenna array relative to the position of the satellite of the GPS is specifically determined from the phase difference of the Costas Loop output signals in an evaluating device.

The determination of the direction of the pointing angle in three-dimensional space is possible by the addition of at least one linear antenna array.

An advantage of the direction determining system of the present invention is the capability of fast switching from a first antenna to a second antenna.

These and other objects and advantages of the present invention will no doubt become obvious to those of ordinary skill in the art after having read the following detailed description of the preferred embodiment which is illustrated in the drawing figure.

IN THE DRAWING

FIG. 1 is a block diagram of a direction determining system in accordance with the present invention.

DETAILED DESCRIPTION OF THE PREFERRED EMBODIMENT

FIG. 1 illustrates a direction determining system referred to by the general reference character 100 and incorporating the present invention. The direction determining system 100 includes a linear antenna array 200 comprising a plurality of two antenna elements 1, 1', a radio frequency (RF) section 2, an intermediate frequency (IF) section 3, a digitizer 4, a multiplier 5, a sampling device 6, a memory 7, a divider 8, a clock generator 9, a counter 10, and an output switch 11. A first Costas Loop 300 is comprised of a first multiplier 12, a second multiplier 13, a quarter-period phase shifter 14, a clock generator 15, a first summer circuit 16, a second summer circuit 17, a combination multiplier 19 and a digital low pass filter 32. Likewise, a second Costas Loop 400 comprises a first multiplier 12', a second multiplier 13', a quarter-period phase shifter 14', a clock generator 15', a first summer circuit 16', a second summer circuit 17', a combination multiplier 19' and a digital low pass filter 32'. Additionally, the direction determining system 100 includes a first squaring circuit 18, a second squaring circuit 20, a combination summing circuit 21, an alternating switch device 22, a first digital low pass filter 23, a second digital low pass filter 24, a computer 25, a switching clock generator 26, a phase meter 27, an evaluating device 28, an input switch 29, a data evaluation output 30 and a distance evaluation output 31.

The Global Positioning System (GPS) receiver which is comprised of the first Costas Loop 300 and the second Costas Loop 400 will initially be described and then additional structure required for direction determination will be described. A signal (S1) from a GPS satellite is intercepted (received) by the antenna 1 and fed to the RF section 2 for processing. The processed signal (S1) is fed from the RF section 2 to the IF section 3 where the frequency of the received signal (S1) is shifted to five kilohertz (5 KHz). The intermediate frequency is chosen to be unequal to zero even if the maximum expected Doppler shift occurs. The IF signal is then digitized in the digitizer 4 which provides a signal (S2) which is a one-state signal if a threshold is exceeded or is a zero-state signal if the threshold is not exceeded. A suitable threshold is an amplitude of zero. The received carrier signal (S1) is modulated by data forming a modulated carrier signal. A noise signal having an amplitude of approximately twenty decibels (20 dB) greater than that of the modulated carrier signal is superimposed onto the received carrier signal (S1). In the absence of the receiver carrier signal (S1), the number of zeros and ones in the digitized signal (S2) is identical. The digitized signal (S2) is then multiplied by a pseudo-random code (PRC) in the multiplier 5 and the signal thus produced is sampled in the sampling device 6 at twice the frequency at which the PRC is read out of the memory 7. Beyond the multiplier 5, the zeros and ones will not be equally distributed throughout the signal if the carrier signal (S1) is present, notwithstanding the presence or absence of a modulating signal for data transmission. The distribution of the frequency of occurrence of the zeros and ones will change at the intermediate frequency of the carrier signal, i.e. at 5 KHz if the received signal (S1) is not subjected to a Doppler shift. If the received signal (S1) has the expected Doppler frequencies, the distribution of the frequency of occurrence of the zeros and ones will change at the intermediate frequency of the carrier signal at a rate between 500 Hz and 9.5 KHz.

The output signal of the sampling device 6 is supplied to the counter 10. In the absence of the carrier signal, the count of the counter 10 increases linearly. However, in the presence of the carrier signal with or without a modulating signal, the variation of the count with time produces a line whose slope is alternately greater and less than that representing the linear increase of the count. These counts are continuously fed to the first multiplier 12 and the second multiplier 13 with each supplied with a signal (S4) from the clock generator 15 which consist of a regular sequence of plus ones (+1s) and minus ones (−1s). The clock rate of clock generator 15 is equal to the intermediate frequency because the signal (S4) contains any Doppler shift that may be present. The signal (S4) for the second multiplier 13 is shifted with respect to the signal (S4) for the first multiplier 12 by a quarter period of the IF signal. The shifting of the signal (S4) is accomplished by the phase shifter 14. The output signals from the first multiplier 12 and the second multiplier 13 correspond respectively to the (I) and (Q) components of the signals as are produced in known receivers and are also employed for producing control signals in the novel GPS receiver. In the first summer circuit 16 and the second summer circuit 17, summing values are formed for each period of the clock signal (S4) provided by the clock generator 15. Those sums are:

$$I = -Z(O) + 2Z(\pi) - Z(2\pi) \quad (1)$$

and $$Q = -Z(O) + 2Z(\pi/2) - 2Z(3\pi/2) + Z(2\pi), \quad (2)$$

where each of the addends is the respective count at the instants enclosed in parentheses. The control lines which ensure that the counts are further processed at the desired times are not illustrated in the drawing because those of ordinary skill in the art will be able to appropriately complement the direction determining system 100 shown in the drawing if they are aware of its operation.

The sums (I) and (Q) are multiplied together in the combination multiplier 19, and the values resulting from the multiplication are fed to the digital low-pass filter 32. The output signal of the digital low-pass filter 32 controls the frequency and the phase of the clock generator 15 such that the output signal (S4) of the clock generator 15 has the same phase and frequency as the received carrier signal (S1) converted to the IF value.

The first multiplier 12, the second multiplier 13, the combination multiplier 19, the first summer circuit 16, the second summer circuit 17, the digital low-pass filter 32, the clock generator 15 and the phase shifter 14 form the first Costas Loop 300. In the steady state, the sequence of numerical values (I) delivered by the first summer circuit 16 represents the modulating signal from which the data transmitted via the modulating signal is recovered in an evaluation device (not shown) in a known manner. The values of (I) and (Q) are supplied not only to the combination multiplier 19 but also to the first squaring circuit 18 and the second squaring circuit 20, respectively, where the values of (I) and (Q) are squared. The values of (I) are also supplied to the data evaluation output 30. The squared values of (I) and (Q) from the first and second squaring circuits 18, 20 are summed in the combination summing circuit 21 providing summing values which represent the amplitude of the carrier signal. The summation of the squared values of (I) and (Q) are alternately provided to the first digital low-pass filter 23 and to the second digital low-pass filter 24 by the alternating switch device 22. Switching of the alternating switch device 22 occurs at the same rate at which the pseudo-random code (PRC) is read from the memory 7 (e.g. at a clock rate of 125 Hz). The output signals from the first digital low-pass filter 23 and the second digital low-pass filter 24 are fed to the computer 25 where the sum of and the differences between these values are calculated. From this, the output from computer 25 is fed to the distance evaluation output 31 and a computer control signal (S5) is derived in a known manner which controls the phase of the clock signal (S6) generated in the clock generator 9. After being divided by two in the divider 8, the clock signal (S6) controls the readout of the pseudo-random code (PRC) from the memory 7. The clock signal (S6) from the clock generator 9 also serves as the clock signal for the sampling circuit 6. Phase control is performed such that the PRC stored in the GPS receiver has the same phase as the PRC of the received signal (S1). The time position of the PRC compared to a reference period is proportional to the distance between the GPS receiver and the transmitter station and therefore is also supplied to the evaluating device (not shown).

The sampling device 6, the memory 7, the divider 8, the clock generator 9, the counter 10, the first multiplier 12, the first and second summer circuits 16, 17, the first and second squaring circuits 18, 20, the combination summing circuit 21, the first and second digital low-pass filters 23, 24 and the computer 25 form an early/late control loop 500. To implement the control loop 500

(which is known in the art), the clock signal (S6) from the clock generator 9 is periodically advanced and delayed by one clock period as is also known from the cited GPS literature. This procedure is controlled by the computer at a clock rate of 125 Hz. As with the first Costas Loop in FIG. 1, the clock signals following from the operation described as the early/late control loop 500 are not graphically illustrated because those of ordinary skill in the art will be able to make the appropriate complementation. The implementation of the individual elements described herein is also within the ability of the skilled practitioner. For example, the multiplier 5 can be an exclusive-OR gate and the sampling circuit 6 is implemented with a JK flip-flop logic device which receives the necessary clock signal (S6) from the clock generator 9. It is also possible to implement some of the elements with a computer since numerical values are processed at numerous points.

In the description hereinabove, reference is made to the pseudo-random code (PRC) and in the GPS a specific PRC is assigned to each satellite (i.e. the transmitting station). For navigation purposes, it is necessary to measure the distances to several satellites simultaneously or at least measure the distances in rapid succession. In the novel GPS receiver, the rapid succession distance measurements can be achieved in an advantageous manner employing time-division multiplexing. Therefore, each satellite involved in the measurement must have the PRC assigned to that satellite stored in the GPS receiver. Change over from one PRC of a satellite to the next PRC of the following satellite occurs every millisecond with the above-described control operations being performed during these periods. The control circuits remain in lock with all the desired satellites and data demodulation of the signals received from all the satellites is possible without interruption.

In the novel direction-determining system 100, the known interferometer principle is utilized for providing antenna pointing angle information. Interferometry is the art of employing interference phenomena between a reference wave and an experimental wave, or between two parts of an experimental wave to determine wavelengths, wave velocities, distances and directions by utilizing any of several optical, acoustical, or radio-frequency instruments. The art of determining antenna pointing angle information via interferometry is also described in the above-cited U.S. Pat. No. 4,384,293 and therefore need not be explained again here. It is only important to realize that the phase of the received signal (S1) is measured at two points which are spatially separated from each other. Therefore, the second antenna 1' is provided in addition to the first antenna 1. The distance between the first and the second antennas 1, 1' depends on the measurement accuracy desired. Generally, accuracy increases with increasing distance between the two antennas 1, 1'. However, one should be reminded that if the distance "L" between the antennas 1, 1' becomes greater than the wavelength ($\lambda$) of the received GPS signal (S1), the measurement becomes ambiguous. To resolve this ambiguity, there are several known solutions: first, an additional course measurement may be performed; second, GPS signals of different frequencies may be evaluated; or third, the course direction may be determined using a compass. As the elimination of ambiguity is within the ability of the skilled practitioner, it will not be dealt with here in greater detail.

The input switch 29 alternately passes the GPS signal (S1) received by the antennas 1 and 1' to the RF section 2. The output switch 11 alternately passes the output signal (S7) of the counter 10 to the first Costas Loop 300 described or to the second Costas Loop 400 depending on the position of the input switch 29. The second Costas Loop 400 contains the same elements as the first Costas Loop 300 except the reference characters of the second Costas Loop 400 are each provided with a prime designation. Both of the switches 11 and 29 are controlled in synchronism by the clock generator 26 which ensures that the received signal (S1) from the first antenna 1 is transmitted to the first Costas Loop 300 and the received signal (S1') from the second antenna 1' is transmitted to the second Costas Loop 400. The switching sequence is so chosen that each of the first and second Costas Loops 300, 400 remains locked to the GPS received signal (S1) applied to it. Minor variations during the "off" period are compensated for during the "on" period. Such variations may be caused by movements of the satellites and by the finite stability of the oscillator (not shown) of the GPS receiver. In this arrangement, a major advantage is that the GPS receiver elements which are highly critical with respect to possible variations of signal delays are present only once. An example of such a component element is the RF section 2. Thus, any variations that may be present are the same for the GPS signals received by each of the antenna 1 and 1'. Neither of the first or second Costas Loops 300, 400 are critical in this respect.

The signal (S4) provided by the clock generator 15 is in phase with the received GPS signal (S1) which is converted to the IF value. The same situation applies to the signal (S4') generated by the clock generator 15'. Therefore, the direction of the pointing angle of the linear antenna array 200 relative to the position of the satellite of the GPS is determined from the phase difference between the output signals (S4, S4') of the clock generators 15, 15' on the interferometer principle described above. The phase difference ($\Delta\psi$) is measured in the phase meter 27 and the measured value is evaluated in the evaluating device 28. Depending on the direction to be measured, the evaluating device 28 is additionally supplied with the satellite data and its own position which is already available in the GPS receiver. Specifically, the direction to be measured is the angle between the linear antenna array 200 and a straight line between the linear antenna array 200 and the satellite direction in the coordinate system.

To determine the direction of the pointing angle in a three-dimensional space, at least one additional linear antenna array is required which makes an angle preferably of 90° with the first linear antenna array 200. Note that one of the antenna elements may be common to both of the linear antenna arrays and it is possible to choose a different antenna arrangement. The only requirement is to ensure that evaluation can be performed on the interferometer principle and that suitable antenna pairs (1, 1') can be selected for this purpose. The number of Costas Loops is chosen according to the number of interferometer arrangements to be evaluated. The circuit arrangement is then adapted accordingly. The evaluation will not be described in detail as it is within the ability of the ordinary practitioner. Because of the finite noise level in the RF section and due to the phase noise of the oscillators in the GPS receiver and the GPS satellites, the phases of the carrier signals recovered in the first and second Costas Loops 300, 400 will vary randomly with time. However, this error can be reduced by the process of averaging.

Although the present invention has been described in terms of the presently preferred embodiment(s), it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A direction-determining system comprising, in combination:
    a linear antenna array having at least first and second antenna elements, each for receiving an input signal from a Global Positioning System transmitter;
    Global Positioning System receiver means including signal processing means for receiving said input signal from said linear antenna array and for converting it to an intermediate frequency signal, and
    a first phase-locked loop adapted to lock with the phase of the input signal received from said first antenna element and having a first output signal representative of the phase thereof;
    a second phase-locked loop adapted to lock with the phase of the input signal received from said second antenna element and having a second output signal representative of the phase thereof;
    synchronized switching means for selectively providing a first or second path from a selected said first or second antenna element to an input of said signal processing means and in synchronization therewith a third or fourth path from an output of said signal processing means to a corresponding said first or second phase-locked loop; and
    means responsive to the phase difference between said phase locked loop output signals for determining the pointing angle of said linear antenna array,
    wherein said signal processing means includes a single radio frequency section,
    wherein each said selected one of said antenna elements is in intermittent electrical communication with its said corresponding phase-locked loop through said single radio frequency section and
    wherein said synchronized switching means functions sufficiently rapidly that each phase-locked loop remains locked to its said corresponding received input signal.

2. The direction-determining system of claim 1 wherein said synchronized switching means comprises a plurality of high-speed switches and a switching clock generator for synchronizing said plurality of high-speed switches.

3. The direction-determining system of claim 2 wherein said plurality of synchronized high-speed switches consists of two synchronized high-speed switches.

4. The direction-determining system of claim 1 wherein said first and second phase-locked loops each comprises a respective first or second Costas Loop having a respective first or second clock generator.

5. The direction-determining system of claim 4 wherein said means responsive to the phase difference between said phase locked loop output signals is a phase meter coupled between the respective outputs of said first and second clock generators.

6. The direction-determining system of claim 5 wherein said respective outputs of said first of second clock generators are each in phase with the received input signal of the corresponding antenna element from a common source, whereby the phase difference measured by said phase meter is representative of the precise pointing angle of said linear antenna array relative to said common source.

7. The direction-determining system of claim 6 wherein the plurality of antenna elements are spaced apart a distance L, said distance L being less than the magnitude of the wavelength of said received input signal for maximizing the accuracy of the pointing angle of the linear antenna array.

* * * * *